United States Patent [19]
Church et al.

[11] Patent Number: 5,749,769
[45] Date of Patent: May 12, 1998

[54] LAPPING PROCESS USING MICRO-ADVANCEMENT FOR OPTIMIZING FLATNESS OF A MAGNETIC HEAD AIR BEARING SURFACE

[75] Inventors: Mark A. Church, Los Gatos; Alain Michel Desouches, Santa Cruz, both of Calif.

[73] Assignee: International Business Machines Corporation, Armonk, N.Y.

[21] Appl. No.: 674,054

[22] Filed: Jul. 1, 1996

Related U.S. Application Data

[63] Continuation-in-part of Ser. No. 476,787, Jun. 7, 1995, which is a continuation-in-part of Ser. No. 358,124, Dec. 16, 1994, Pat. No. 5,603,156.

[51] Int. Cl.[6] ........................................ B24B 37/04
[52] U.S. Cl. .................... 451/5; 451/14; 451/57; 451/272; 29/603.16; 29/603.12
[58] Field of Search ........................ 451/28, 56, 57, 451/5, 14, 23, 272; 29/603.12, 603.15, 603.16

[56] References Cited

U.S. PATENT DOCUMENTS

| | | | |
|---|---|---|---|
| 3,685,216 | 8/1972 | Frey et al. | 51/325 |
| 3,748,790 | 7/1973 | Pizzarello et al. | 51/58 |
| 4,010,574 | 3/1977 | Feierbend et al. | 451/272 |
| 4,226,018 | 10/1980 | Nakanishi et al. | 451/259 |
| 4,536,992 | 8/1985 | Hennenfent et al. | 451/259 |
| 4,759,118 | 7/1988 | Nakashima et al. | 29/603.14 |
| 4,785,366 | 11/1988 | Krounbi et al. | 360/113 |
| 4,912,883 | 4/1990 | Chang et al. | 51/165 |
| 4,914,868 | 4/1990 | Church et al. | 29/603.16 |
| 5,065,483 | 11/1991 | Zammit | 29/603 |
| 5,095,613 | 3/1992 | Hussinger et al. | 29/603 |
| 5,136,775 | 8/1992 | Onoe et al. | 29/603.12 |
| 5,203,119 | 4/1993 | Cole | 51/165 |
| 5,206,590 | 4/1993 | Dieny et al. | 324/252 |
| 5,224,304 | 7/1993 | Cesna | 51/281 |
| 5,463,805 | 11/1995 | Mowry et al. | 29/603.09 |
| 5,603,156 | 2/1997 | Biskeborn et al. | 451/259 |

*Primary Examiner*—Robert A. Rose
*Attorney, Agent, or Firm*—Baker Maxham Jester & Meador

[57] ABSTRACT

A lapping method and device for lapping magnetic heads to provide an air bearing surface with improved surface quality including increased smoothness, reduced rolloff, and reduced recession. The lapping machine includes a lapping plate having a grinding surface, a linear motion mechanism for moving the ABS over the grinding surface in a first, linear direction, and a micro-advance mechanism for controllably advancing the workpiece over the grinding surface in a second direction that is preferably perpendicular. The lapping method comprises affixing the unfinished magnetic head proximate to the lapping plate and depositing an abrasive slurry on the grinding surface. An initial rough lapping stage is performed, including moving the grinding surface so that the workpiece is lapped to a first predetermined target specification. After washing, a conductive lubricant material is applied to the grinding surface, other lapping steps may be performed, and then a micro-advanced lapping stage is performed, including micro-advancing the magnetic head in the second direction while simultaneously linear lapping it in the first direction to provide a highly polished ABS.

25 Claims, 8 Drawing Sheets

5,749,769

LAPPING PROCESS USING MICRO-ADVANCEMENT FOR OPTIMIZING FLATNESS OF A MAGNETIC HEAD AIR BEARING SURFACE

RELATED APPLICATIONS

This application is a continuation-in-part of U.S. patent application Ser. No. 08/476,787, filed on Jun. 7, 1995, pending, which is a continuation-in-part of U.S. patent application Ser. No. 08/358,124, filed on Dec. 16, 1994 now U.S. Pat. No. 5,603,156.

BACKGROUND OF THE INVENTION

1. Field of the Invention

The present invention relates to a method and apparatus for forming flat surfaces by precision lapping, and particularly to manufacturing a thin film magnetic transducer head using a precision lapping process to form a substantially flat air bearing surface.

2. Description of the Related Art

In data processing systems, magnetic recording systems are extensively used for data storage. In magnetic disk drive systems, data is read from and written onto magnetic recording media utilizing a magnetic transducer commonly referred to as a magnetic head. Typically, one or more magnetic recording disks are mounted on a spindle such that the disks can rotate and the magnetic head is mounted on a movable arm to be positioned closely adjacent to the rotating disk surface to read or write information thereon.

During operation of the disk drive system, an actuator mechanism moves the magnetic transducer to a desired radial position on the surface of the rotating disk where the magnetic head reads or writes data. Usually, the head is integrally mounted in a carrier or support referred to as a "slider". A slider generally serves to mechanically support the head and any electrical connections between the head and the rest of the disk drive system. Typically, a slider is formed with an aerodynamically shaped surface that glides over the disk surface during operation, known as the air bearing surface (ABS). Using the ABS, the slider can maintain a uniform distance from the surface of the rotating disk for optimum performance, while preventing the head from undesirably contacting the disk.

A magnetic head typically includes an inductive electromagnetic device including magnetic pole pieces that read the data from or write the data onto the recording media surface. Some magnetic heads include a magnetoresistive (MR) read element for separately reading the recorded data, with the inductive element serving to only write the data. In either case, the inductive element magnetic pole pieces and MR read elements terminate on the air bearing surface and function to interact with the data contained in the magnetic recording disk.

In manufacturing such read/write heads, wafer-level processing is a first step. A large number of sliders are fabricated from a single wafer having rows of the magnetic transducers deposited simultaneously on the wafer surface using semiconductor-type methods including deposition and etching as appropriate. After wafer-level processing is complete, one or more bars are sliced from the wafer, each bar comprising a row of unfinished slider units. Each bar is affixed to a fixture or tool where it is lapped to form a smooth ABS. The technique for forming a smooth ABS is termed "lapping", and requires precision grinding and polishing techniques to accomplish its goal of providing a surface smooth within predetermined specifications. Optional subsequent steps may form features on the air bearing surface or other places on the head using a combination of mechanical and chemical etching processes. After the ABS is finished, the bar is then further diced, i.e. separated, into individual sliders, each slider having at least one magnetic head terminating at the slider air bearing surface.

In order to achieve maximum efficiency from the magnetic heads, the dimensions of the magnetic transducing elements must be maintained within a certain limited tolerance for generating a maximum signal from a given head element. These critical dimensions include "throat height" for the thin film inductive elements, and "element height" in the case of MR read elements. During the row bar processing, it is critical to grind or lap the bar to a desired thickness in order to achieve the desired throat height and MR element height.

Prior art conventional lapping processes utilize oscillatory or rotary motion of the work piece (i.e. the row bar) across either a rotating or oscillating lapping plate to provide a random motion of the work piece over the lapping plate and intentionally randomize lapping-induced plate imperfections across the ABS. For example, see U.S. Pat. No. 4,536,992 granted to Hennenfent on Aug. 27, 1985 wherein a work piece is supported by the free end of a pivotally mounted arm on the surface of a rotating lapping plate. During the lapping process, the motion of abrasive grit carried on the surface of the lapping plate typically includes transverse motion across the layer's magnetic head elements exposed at the slider air bearing surface. The transverse lapping process can cause problems in magnetic heads, particularly MR heads, because the electrically active components exposed at the air bearing surface are made of relatively soft (i.e. ductile) materials. During a transverse lapping process, these electrically active components can scratch and smear into other components unfortunately causing electrical shorts and degrading head performance, possibly severely. With high density recording MR heads, the smearing can become severe enough to cause substantial manufacturing yield loss.

The prior art lapping process using random motion also causes different materials exposed at the slider air bearing surface to lap to different depths resulting in recession of the critical head elements relative to the air bearing surface and thus contributing to poor head performance due to the unpredictable space between the critical elements and the recording disk.

SUMMARY OF THE INVENTION

The present invention provides a lapping method and device particularly suited for lapping magnetic heads with improved surface quality. Particularly, the lapping system increases smoothness of a finished magnetic head, reduces rolloff, and also reduces recession of critical head elements at the air bearing surface during the lapping process.

The lapping machine includes a lapping plate having a grinding surface, a linear motion mechanism for moving the workpiece over the grinding surface in a first, linear direction, and a micro-advance mechanism for controllably advancing the workpiece over the grinding surface in a second direction. Preferably, the second direction is approximately perpendicular to the first direction. The method of lapping the workpiece comprises affixing the workpiece to the lapping machine proximate to the lapping plate and depositing an abrasive slurry on the grinding surface of the lapping plate. An initial rough lapping stage is performed, including moving the grinding surface with respect to the workpiece, so that the workpiece is lapped to a first predetermined lapping target specification. The grinding surface is then washed, other lapping steps may be performed, and then a micro-advance lapping stage is performed, including micro-advancing the workpiece in the second direction while simultaneously linearly lapping the workpiece in the first direction to provide a second predetermined lapping target specification. Preferably, the abrasive slurry comprises a diamond abrasive material, and the rough lapping stage includes moving the grinding plate in a rotary motion with respect to the workpiece to remove large amounts of the surface.

It is believed that a highly polished ABS surface results from a gradual weardown of the diamond particles in the lapping area during the linear lapping process; in other words, as the linear lapping process repeatedly grinds over the same area, the increasingly finer diamond particles cut less and less, thereby reducing recession and providing a flatter ABS surface. Also, it is believed that the micro-advance process minimizes the lateral stress that would otherwise be imposed by lateral motion of the plate and soft surfaces (i.e. the deposited layers) of the ABSs on the row. Also, advantageously, the slow micro-advance movement reduces the effect of smearing, which could otherwise short the MR head to the shields.

The method and apparatus described therein can provide a flat, polished air bearing surface (ABS) on a magnetic head, and substantially reduces rolloff of the finished product. Therefore during operation a predictable air gap distance is provided between the ABS and the magnetic media, and as a result the error rate is substantially reduced. In the parent application, an index-and-move operation is disclosed in which the row of heads is first moved in a linear motion, then pressure is released, then the entire assembly is moved (indexed) a predetermined distance, and the pressure is reapplied and another linear lapping stage is performed. The process disclosed in the parent application operates to minimize smearing of the MR leads during lapping and therefore reduces electrical shorts across the MR head, and furthermore reduces lapping-induced recession of the layers at the ABS. The process disclosed therein also reduces rolloff; however, the method disclosed herein can reduce rolloff even to a greater extent.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawings, wherein:

FIG. 9 also includes arrows illustrating the movement of the lapping tool and the lapping plate during polishing.

DETAILED DESCRIPTION OF THE PREFERRED EMBODIMENTS

Figure 1:
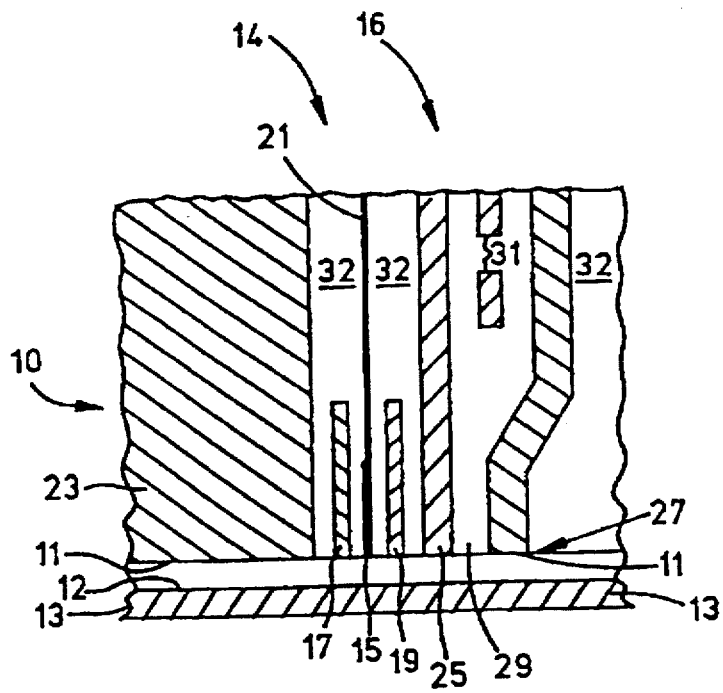
FIG. 1 is a cross-sectional view of a magnetoresistive (MR) magnetic head, having an ABS disposed in facing relationship with a magnetic disk.

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

In the parent application Ser. No. 08/476,787, which is incorporated by reference herein, a lapping process is disclosed that includes an initial phase, a fine lap phase and a subsequent linear lap phase. In the initial phase, a large amount of material is removed by, for example, rotation of a grinding wheel combined with counter rotation of the lapping fixture. The result of these combined motions in the initial phase is removal of a large amount of material in a short time. In the subsequent linear-lapping step, rotation of the grinding wheel and the counter rotation are halted, and the head is moved in a linear oscillatory fashion parallel with the layers deposited in the head. As disclosed, the linear-lapping step substantially reduces element recession that would otherwise result from the transverse motion inherent in the initial random rotational process.

A simple linear lapping process does not fully address rolloff problems on some heads. Rolloff, which occurs proximate to an edge, is an area of excessive curvature caused by cutting an excessive amount of material at the edge during the grinding process. Rolloff is often observed on a number of the heads in a row, but not all. It is believed that rolloff results from slight but unavoidable unevenness of the plate.

In heads manufactured with a simple linear lapping process, rolloff has been measured as high as 40 nanometers in some instances. Rolloff on an ABS can be a significant problem, because the poles of the inductive head and the MR element of the MR head are within the rolloff area and as a result, the magnetic spacing between the heads and the recording media is rendered unpredictable. Unfortunately, the rolloff can be substantial enough that the head fails to meet its specifications. A linear process can produce as much as five percent of the heads with excessive rolloff, while other heads remain within specification.

To reduce rolloff on the ABS, the parent application discloses a series of steps related to the linear lapping step. The steps including moving the magnetic transducer along an oscillatory path parallel to the longitudinal axis of the ABS for a first period, reducing the pressure during a second period and then moving the lapping plate, and then in a third period reapplying the pressure to remove a substantial amount of material from the ABS. However, this "lap-release-move-repeat" process is very time-consuming and therefore expensive. Furthermore, the resulting polished ABS falls short of an extremely polished surface because the head encounters new abrasive after each indexing movement and therefore the abrasive is not worn down finely enough to provide an extremely smooth surface. In comparison, the method disclosed herein discloses a very slow movement (a "micro-advance") of the magnetic transducer over the grinding surface in a direction perpendicular to continuing linear motion that allows the abrasive to become "worn down" enough to provide an extremely smooth polished surface by the time it reaches the head.

Overview

A method is described herein for fabricating a magnetic head for a data storage device. The magnetic head disclosed herein is illustrated as one having both a magnetoresistive (MR) element (sometimes referred to as a "sensor") for reading data from a magnetic medium, and an inductive element for writing to the magnetic medium, formed in a stacked assembly. A planarized air bearing surface (ABS) is formed using the lapping process described herein on the stacked assembly to expose the MR element and the inductive element to the surface of the magnetic medium. Although described in the context of an MR head, the lapping method can be used to fabricate any smooth surface, and particularly an ABS on any type of magnetic head.

The magnetic head formed according to the process described herein can be utilized within conventional disk drive units or conventional tape drive units used to back up other storage systems or for general purpose recording. In a typical configuration, a computer installation includes a disk drive for immediate storage and retrieval, and a magnetic tape drive for back-up storage of information stored within the disk drive.

Description of a MR Head

Figure 2:
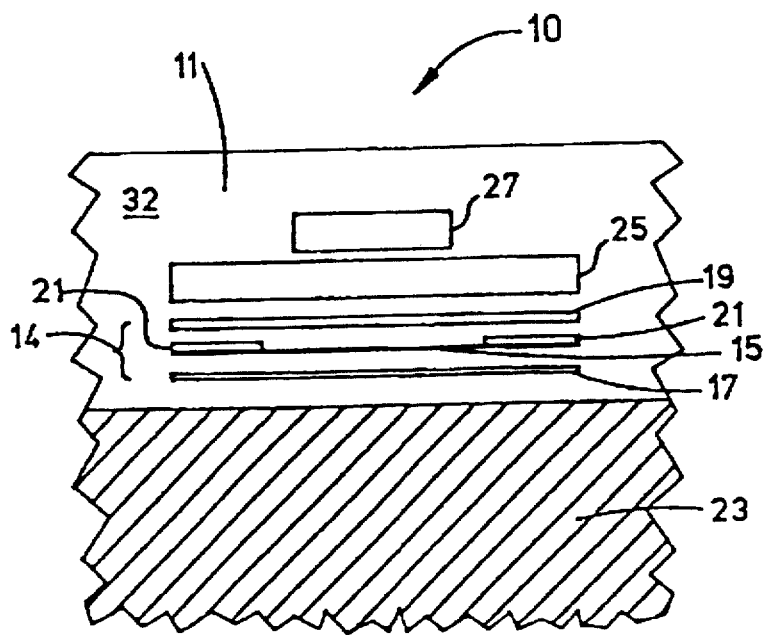
FIG. 2 is a plan view of the magnetic head of FIG. 1, viewed facing the ABS, illustrating the head read/write elements exposed thereon.

Referring now to FIGS. 1 and 2, FIG. 1 is a cross-sectional view of a magnetoresistive (MR) read/inductive write magnetic head shown generally at 10 in transducing relationship with a rotating magnetic recording disk 13 such that a head air bearing surface 11 (ABS) is disposed in facing relationship with, and slightly above, a disk recording surface 12. Typically, such a head 10 includes an MR read assembly 14 and an inductive write assembly 16 formed adjacent one another on a substrate 23. FIG. 2 is a plan view of the magnetic head 10 viewed facing the ABS 11, illustrating the head read/write elements exposed on the ABS.

The MR read assembly 14 comprises an MR sensing element 15 fabricated of a ferromagnetic material, such as a nickel iron (NiFe) alloy, situated between first and second magnetic shield elements 17 and 19, respectively. The MR sensing element can comprise a single layer of NiFe, commonly referred to as Permalloy™, but more typically, the MR sensing element comprises a multilayer magnetic structure, including magnetic bias layers, of the type described in U.S. Pat. No. 4,785,366 or of the type described in U.S. Pat. No. 5,206,590, utilizing the giant MR effect. The shield elements 17 and 19 may be fabricated of a highly permeable magnetic material, such as Permalloy™ described above or Sendust which is a trialloy of aluminumsilicon-iron. It is believed that the magnetic shield elements 17 and 19 minimize or eliminate magnetic interference affecting the MR element 15 thereby eliminating extraneous electrical pulses, and improve the high frequency response. Electrically conductive leads 21, formed of copper (Cu) or other suitable conductive materials, are attached electrically at the end portions of the MR element 15 to couple the MR element to external circuitry (not shown) and thereby provide a means for sensing the electrical resistance of the MR element.

The MR read assembly 14 is fabricated by conventional semiconductor-type techniques such as vacuum deposition techniques, for example sputter deposition on the substrate 23. During fabrication, the various elements of the MR assembly are surrounded and insulated from each other by layers 32 of insulating material, such as silicon dioxide or aluminum oxide (alumina).

The inductive write assembly 16 comprises a lower of first pole piece 25 and an upper or second pole piece 27. The first and second pole pieces 25, 27 are made of a highly permeable magnetic material such as NiFe, and form a magnetic circuit magnetically connected together at a back portion (not shown). As a result, the first and second pole pieces 25 and 27 form a magnetic gap 29 at the air bearing surface 11. An inductive coil 31 is formed by one or more layers of an electrical conductor, generally electroplated copper, disposed between the first and second pole pieces 25, 27. The inductive coil 31 is also connected to external circuitry via conductive leads (not shown). The pole pieces 25, 27 and inductive coil conductors 31 are fabricated by well known processes such as electroplating or sputter deposition. The pole pieces are insulated electrically from the inductive coil and the MR read assembly by layers 32 of insulating material. Additionally, the entire assembly is covered with a capping layer of insulating (and protective) dielectric material 32.

As seen more clearly in FIG. 2, the MR read assembly 14 including magnetic shield elements 17 and 19, the MR read element 15 and its lead conductors 21, and the inductive head 16 (including both inductive pole pieces 25 and 27) terminate in or are exposed at the ABS 11.

The magnetic head 10 shown in FIGS. 1 and 2 is sometimes referred to as a "piggyback" head. An alternative configuration for magnetic head 10 is referred to as a "merged" head (not shown) wherein the second MR magnetic shield element 19 is merged with the inductive write assembly first pole piece 25 to form a single element which performs the functions of both elements. In other words, in a merged head a single layer of NiFe, for example, situated between the MR head and the inductive coil functions as both the second shield and the first pole.

Figure 3:
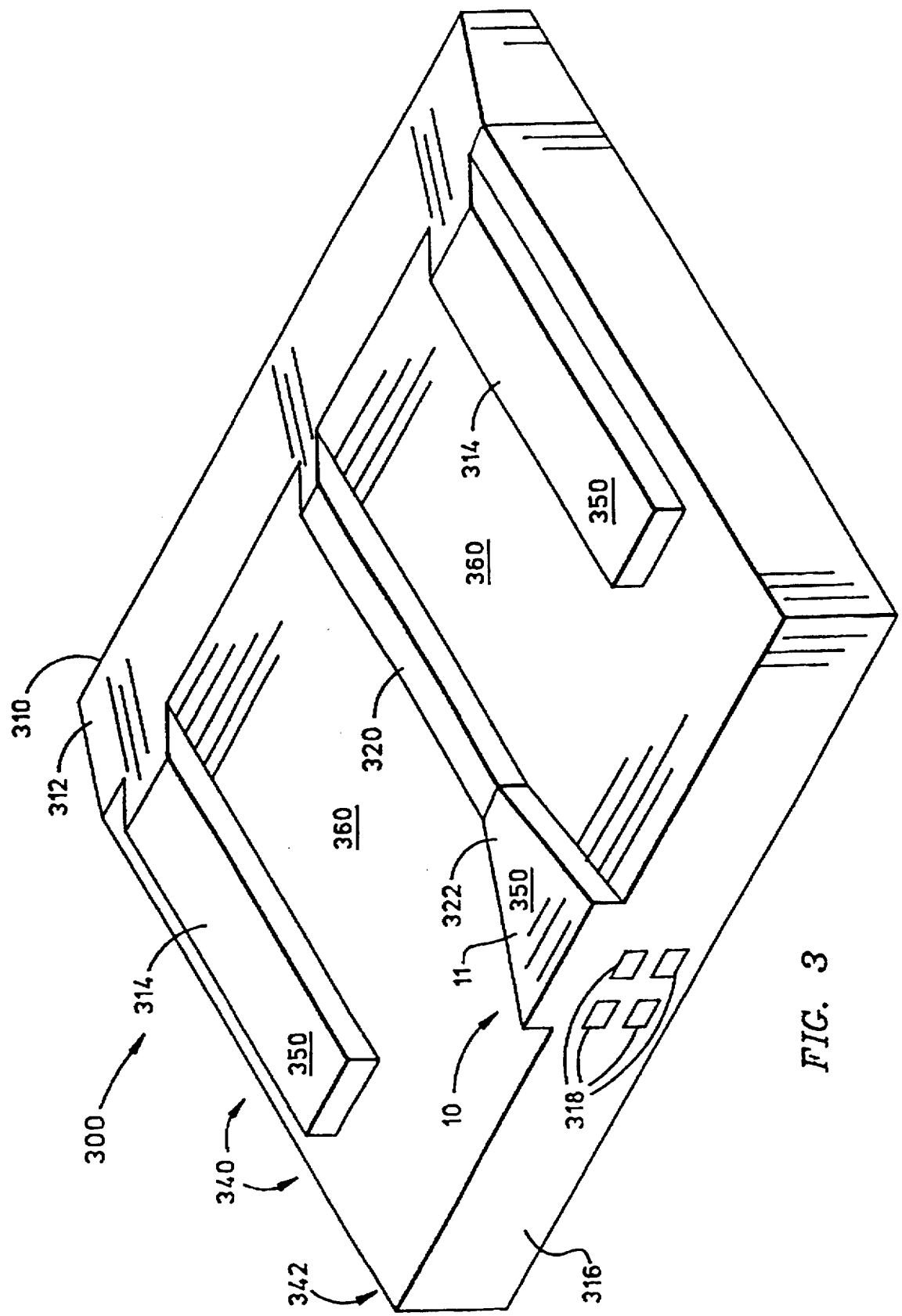
FIG. 3 is a perspective view of one preferred thin film head slider.

Referring now also to FIG. 3, one preferred thin film head slider 300 is illustrated in a perspective view. The slider 300 has a generally rectangular shape and includes features to enhance its aerodynamic performance. Particularly, the slider 300 is finished with features including an angled section 312 formed on a leading edge 310, a pair of ridges 314 extending from the angled section toward a trailing edge 316, and a central ridge 320 including a section 322 that gradually widens as it extends toward the trailing edge 316. The head assembly 10 is situated adjacent to the trailing edge 316. Electrical terminal pads 318 are provided at the surface of the trailing edge 316 to provide electrical connection for the magnetic head elements 14 and 16 (FIGS. 1 and 2).

In its composition, the slider includes two portions: a slider portion 340 defined by the substrate 23 (FIGS. 1 and 2) and a head portion 342 defined by the magnetic head 10 (FIGS. 1 and 2) formed thereon. Typically the head portion 342 defines the slider trailing edge when the slider is suspended ("flying") above and adjacent to a rotating record disk. The slider portion 340, which constitutes the bulk of the thin film head slider 300, is made of a ceramic material such as $Al_2O_3$—TiC or other suitable material.

The top surface 350 of each rail 314 and 320 define an air bearing surface ("ABS") of the slider 300. The rails 314, 320, the recessed face 37 and the ABS 350 and the recessed surface 360 are features that enhance the ability of the head 10 to "fly" a short distance above the surface of the magnetic disk 13.

Figure 4:
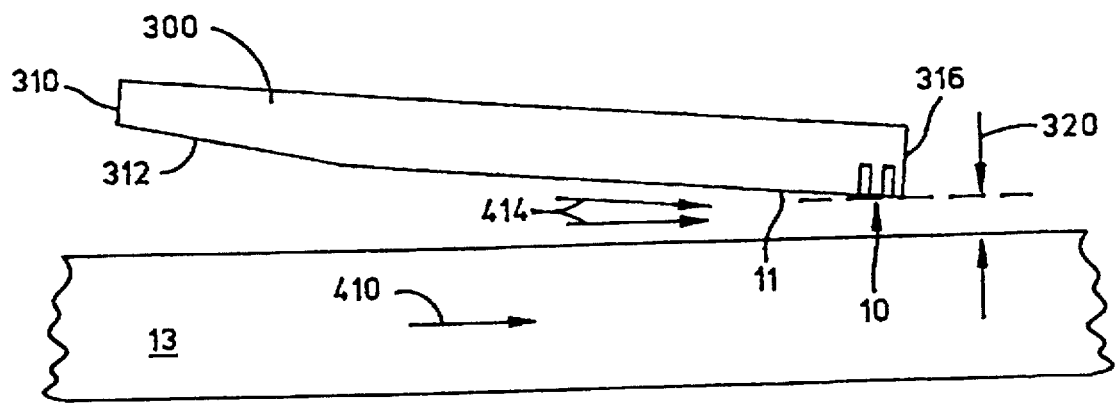
FIG. 4 is a cross-section of the slider of FIG. 3, showing it flying in operation over a magnetic disk.

Reference is now made to FIG. 4, which is a cross-section of the slider 300 of FIG. 3 taken along the center line, showing it "flying" in operation over a magnetic disk 13 that is moving in the direction shown by the arrow 410. As a result of this motion, air illustrated by the arrows 414 flows over the ABS 11 and along the head 10, in order to maintain the slider 300 a known distance above the magnetic disk 13.

The slider 300 includes the leading edge 310, the angled area 312, the ABS 11, and the trailing edge 316. The distance between the trailing edge, proximate to the head 10 and the disk 13, is known as the air gap distance 320. The distance of this air gap in operation is determined by a variety of factors: the speed at which the disk rotates, the weight of the slider, the surface area of the slider, the shape of the slider, and so forth. In a particular design, of course, many or all those factors are known in advance and taken as a constant. However, if there is rolloff in the magnetic head 10 proximate to the trailing edge 316, the air gap distance 320 will become somewhat unpredictable, i.e. the air gap distance 320 will vary from head to head in a production lot. Because the air gap distance is a critical factor for high performance, it is desirable to prevent or substantially reduce rolloff.

Figures 5, 5A, 5B:
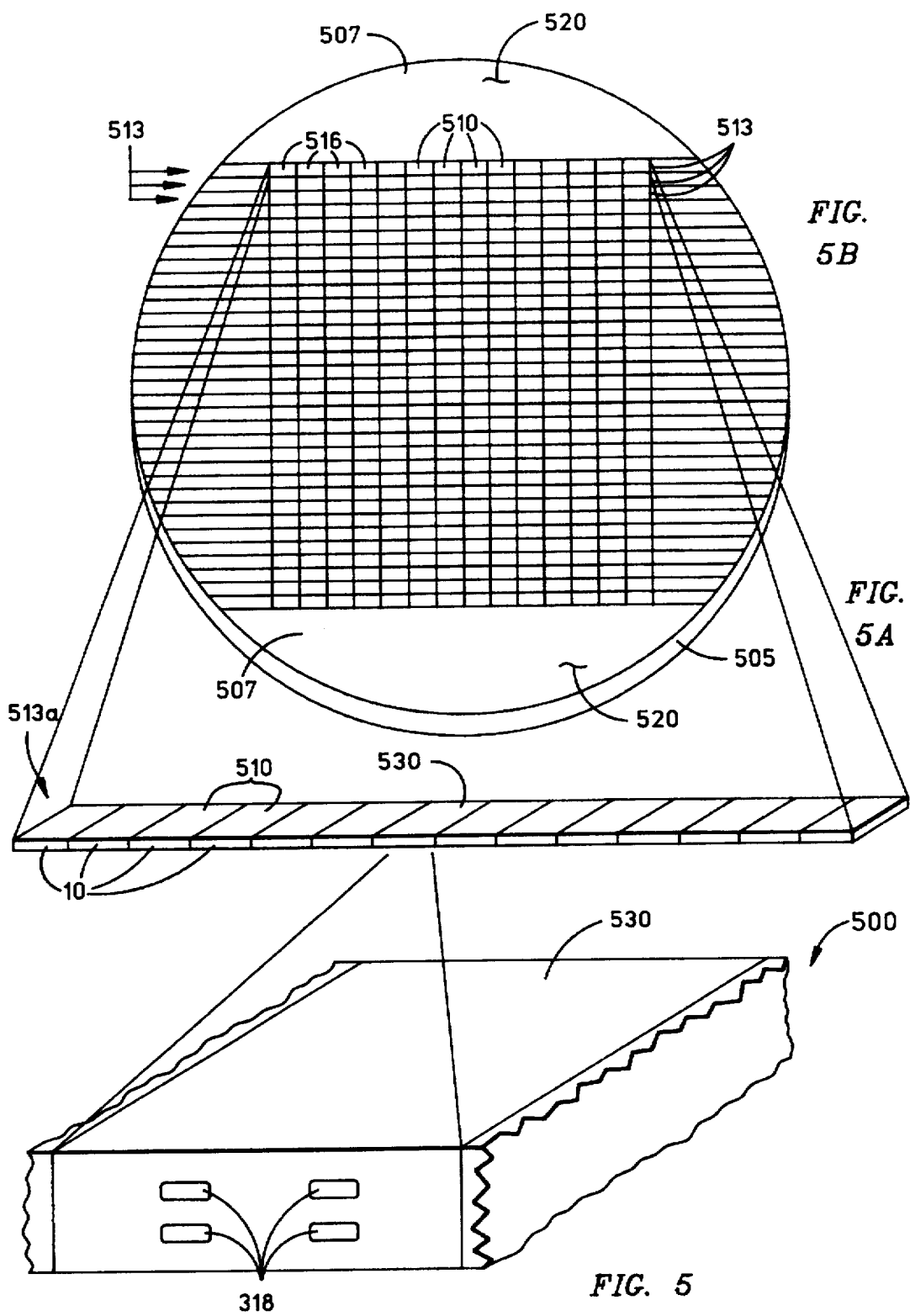
FIG. 5 includes a perspective view of a preprocessed wafer having a plurality of unfinished magnetic heads formed thereon, and also includes a row of the unfinished magnetic heads broken off, from which a single unfinished magnetic head is broken off to illustrate appropriate features.

Referring now also to FIG. 5, the above described slider 300 is fabricated from a preprocessed wafer 500 as shown in FIG. 5. The preprocessed wafer 500 comprises a wafer substrate 505 made of $Al_2O_3$—TiC, covered by a thin layer 507 of alumina, with a plurality of magnetic head devices 10 formed over the alumina 507. Typically, in a finished slider as in FIG. 3 the thickness of the wafer substrate 505 is equal to the length of the finished slider portion 340 and defines a substantial portion of the overall length.

The wafer 500 comprises a matrix of slider units 510 arranged in rows 513 and columns 516 which when fully processed will become sliders 300. As shown in FIG. 5, a plurality of identical row bars 513 each of which comprises a row of identical slider units 510, together with superfluous sections, such as top and bottom sections 520 where no slider units are formed, constitute the wafer 500. The wafer may be fabricated to contain any desirable number of rows 513 of slider units 510 and any desirable number of slider units in each row depending, of course, on the size of the wafer and the size of the sliders. For ease of illustration, FIG. 5 shows a row 513a separated from the wafer structure 500. The view of the row 513a is an end view of the individual slider units 510, with the magnetic heads 10 formed on the nearest ends of the slider units 510. For purposes of illustration, the top facing surface, indicated at 530, is the surface that will be lapped to provide the ABS.

The slider units 510 shown in FIG. 5 are similar to the finished slider 300 shown in FIG. 3 except that the rails 314 and 320 and the recessed face 360 are not yet formed, the ABS is not yet formed, and the throat height for the poles 25, 27 and the MR head elements are greater in the unfinished slider unit 510. Since the throat height for the poles 25, 27 and the MR head elements in each slider unit 51 is greater than in a finished slider 30, lapping on the face 530 of each slider unit 510 in a controlled manner is accomplished to obtain a slider 300 as shown in FIG. 3 with the desired ABS smoothness and throat and element heights. The desired throat heights and MR head element heights are achieved by the provision of lapping guides at the time the wafer is fabricated. The lapping guides are then used as indicators of element height during the lapping process for the slider units 510. The final height of the MR element is typically determined by measuring the resistance of the MR element itself. See, for example, U.S. Pat. Nos. 4,914,868 and 4,912,883.

Figure 6:
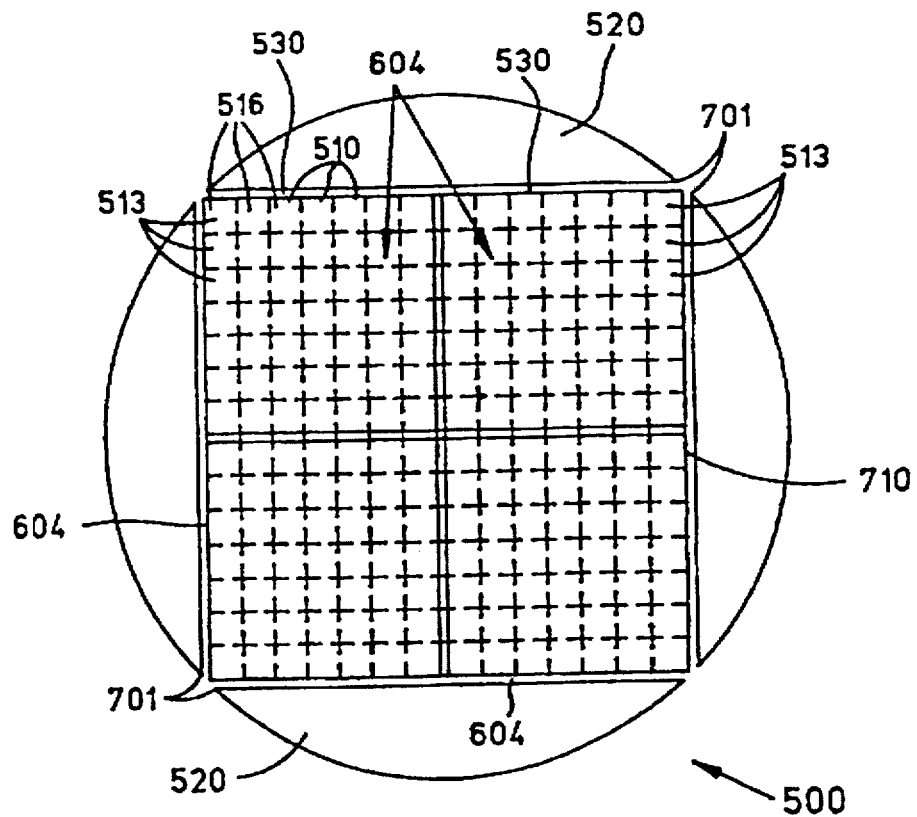
FIG. 6 is a perspective view of a wafer split into four quadrants with the superfluous edge sections separated therefrom.

Reference is now made to FIG. 6, which illustrates a wafer 500 having rows 513 of slider units 510 formed thereon as described above with reference to FIG. 5. When fabrication of the magnetic heads on the slider units 510 is complete at the wafer level, the wafer 500 is sliced into one or more sections, each section comprising at least one row of slider units 510. Superfluous sections 520 are sliced from the wafer by cuts 701 to form a generally rectangularly-shaped wafer element 604. One edge of the wafer element 604 corresponds to the face 530 for a row 513 of slider units 510. Thus, the wafer 500 is divided into four quadrants 604, each quadrant including a plurality of rows 513 and columns 516. In any particular embodiment, the number of rows and columns would of course depend upon the eventual use to which it will be put, and particularly the size of the tooling used to hold and process it. Each row will be processed (i.e. lapped) one edge at a time. Particularly, each quadrant 604 has an exposed edge 530 that will be lapped and processed to provide an ABS.

Figure 7:
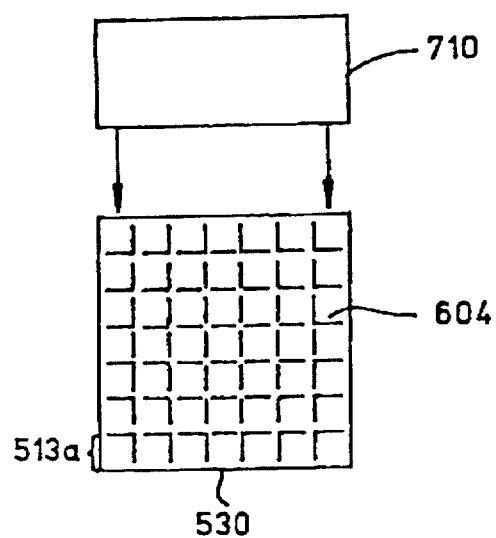
FIG. 7 is a view of a cutout quadrant wafer section being bonded to a wafer extension.
Figure 8:
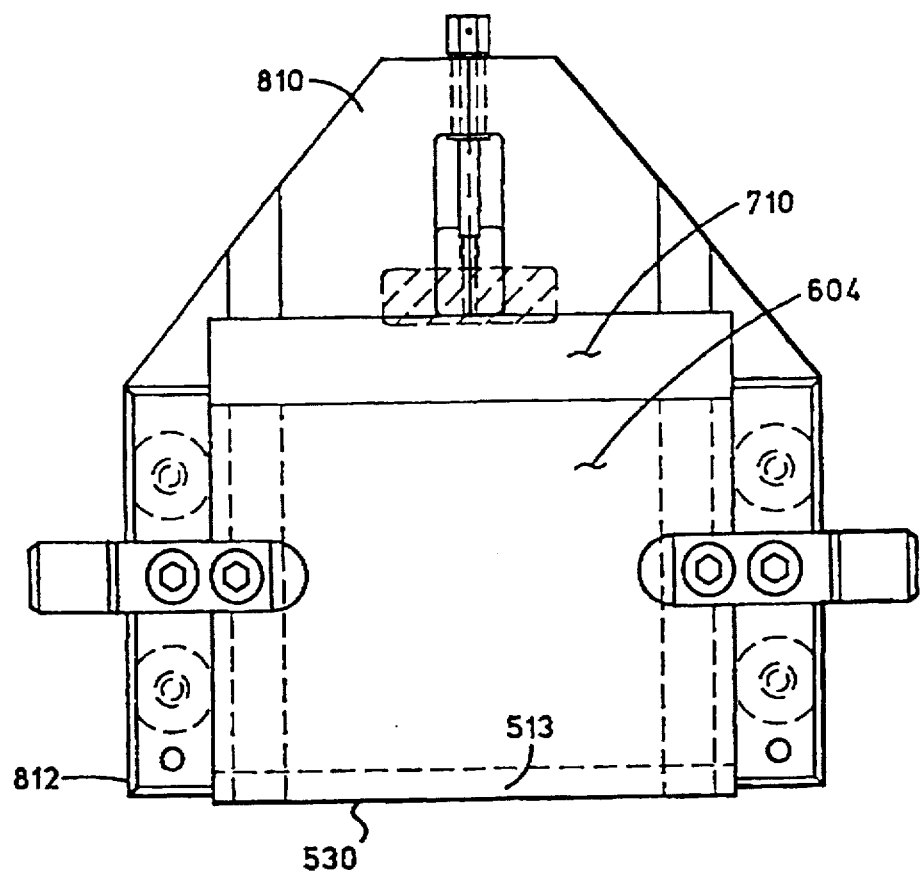
FIG. 8 is a perspective view of a lapping tool for holding the wafer element and wafer extension, for supporting the wafer element for lapping.

Reference is now made to FIG. 7. A cut-out wafer section 604 is then bonded to a wafer extension 710 in such a manner that the slider unit 510 face 530 is exposed for lapping as well as other mechanical processing operations to be performed on face 530 while the row bar is affixed to the tool 710. The wafer element 604, bonded to the extension 710 at an edge opposite the slider unit face 530, is then affixed to a lapping tool 810. The purpose of the tool 810 is to provide a firm structure for holding the wafer section 604 as each row 513 is lapped and subsequently sliced. Once bonded to the wafer extension 710, the wafer element 604 is loaded into the lapping tool 810 as shown in FIG. 8, which is conventional in nature and supports the wafer element 604 and extension 710 in accordance with known techniques. When loaded in the lapping fixture 710, the faces 530 of a row 513 of slider units are exposed for lapping at a lower end 812 of the lapping fixture. The process of lapping each row 513 of the wafer element 604 is described with reference to FIG. 9, for example when the lapping process is complete, the finished row is separated by slicing and the process is repeated until the last row is lapped and debonded from the extension 710. While only one wafer element 604 is shown in FIG. 8, the wafer 500 can be separated into two or more smaller elements optimized to achieve minimum internal stress and row bow or to be compatible with a given manufacturing tool set (not shown). The exposed face 530 of the row bar 513a is subjected to a series of etching, grinding and lapping processes to define (as shown in FIG. 3) the air bearing surface rails 314, to form ramps 312, to create the recessed slider face 360 between the air bearing surface 350 and to obtain a proper throat height for the poles 25, 27 and element heights for the MR head elements. The row bar 513a thus processed is then subjected to a dicing process, i.e.

vertical cuts are made in the row 513 to separate the slider units 510, thereby forming the completed slider 300. The rail definition, ramp formation, row dicing and other mechanical processes are well known in the art.

Figure 11:
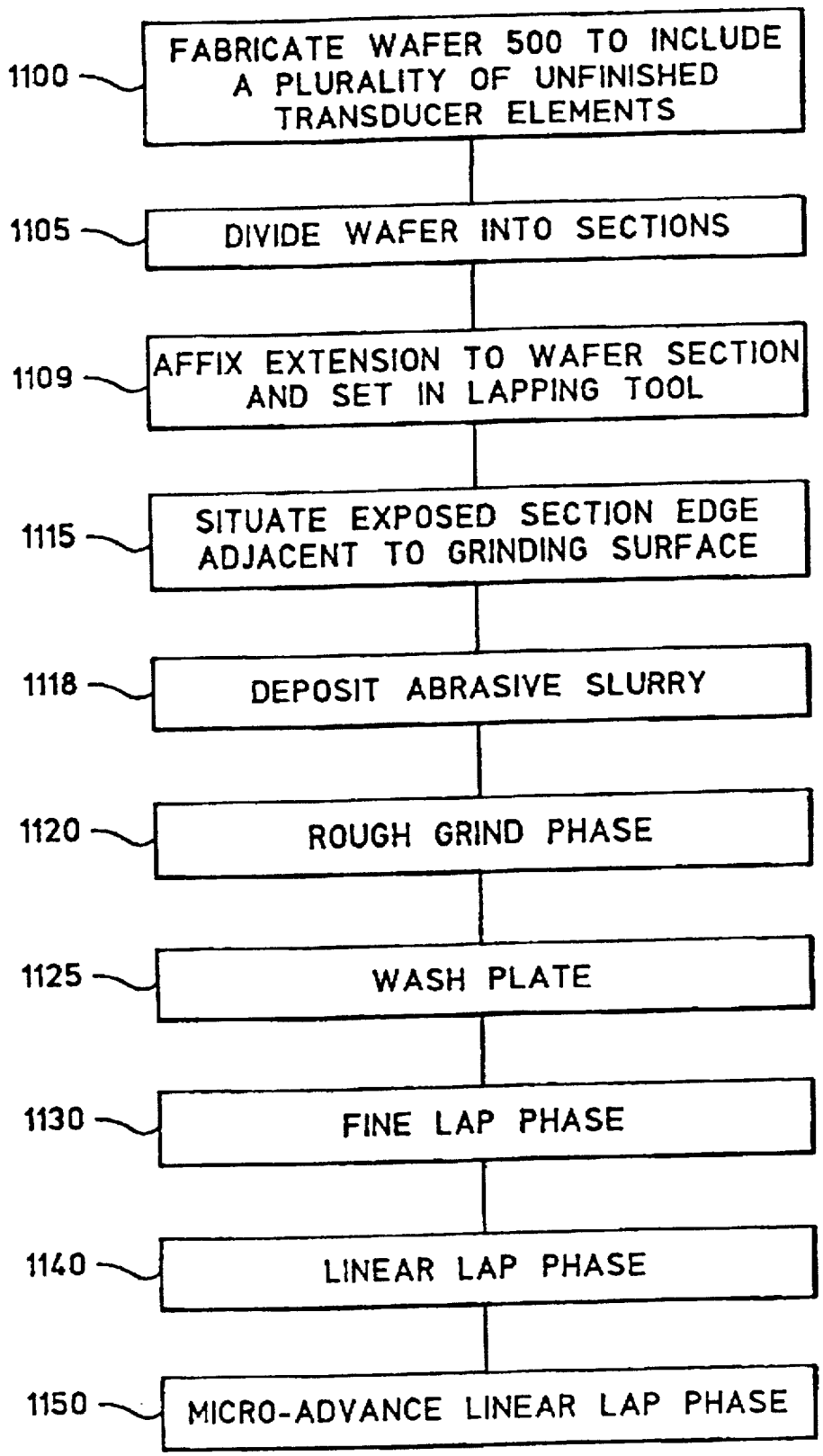
FIG. 11 is a flow chart of steps to fabricate a transducer head beginning at the wafer level and continuing through the lapping phases.

Reference is now made to FIG. 11, which is a flow chart illustrating operations beginning with wafer fabrication to form a polished ABS. Particularly, FIG. 11 summarizes the wafer-level process described above, and adds additional steps regarding the ABS lapping process. Beginning in the box 1100, the wafer 500 is fabricated by deposition processing to form a plurality of unfinished transducer elements aligned in a plurality of rows. In a box 1105 the wafer is divided into sections including at least one row of unfinished transducer elements having an exposed edge to be lapped to form an air bearing surface. In step 1109, the extension is affixed to a wafer section and set into a lapping tool. In a next step 1115, the lapping tool together with the section is affixed to a lapping machine situated so that the exposed section edge is positioned adjacent to a grinding surface.

Figure 9:
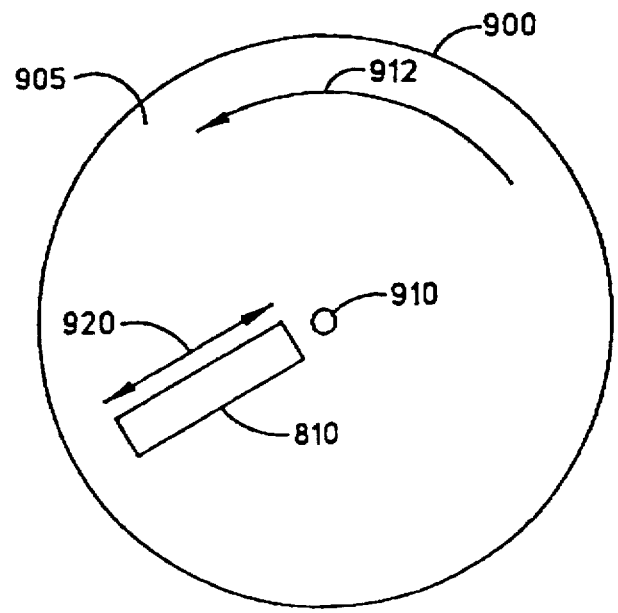
FIG. 9 is a perspective view of a lapping plate having a grinding surface, and a lapping tool positioned thereon.
Figure 10:
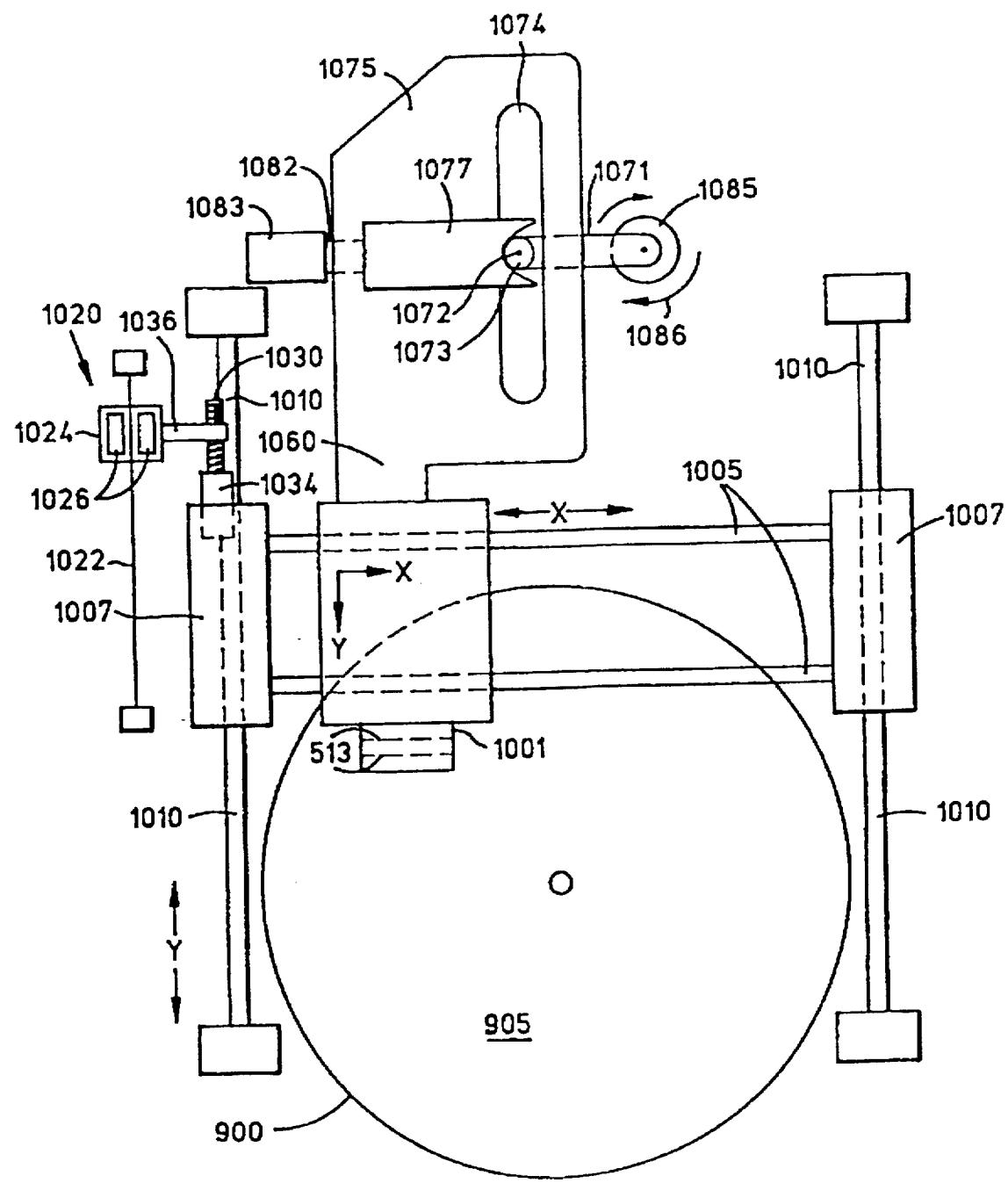
FIG. 10 is a plan view of the lapping apparatus implementing the linear lapping process and the micro-advance mechanism.

Referring now also to FIG. 9 together with FIG. 11, the preferred lapping process comprises four basic phases: a fast ("rough") grind phase 1120, a fine lap phase 1130, an initial linear lap phase 1140, and a micro-advanced linear lap phase 1150. During the lapping process, the exposed face 530 of a row bar 513 attached to a lapping tool 810 is maintained in appropriate contact pressure with a grinding surface 905 of a lapping plate 900 by a suspension arm or other means (such as shown in FIG. 10) capable of moving the lapping tool 810 over the surface of the lapping plate 900. Before the rough grinding phase 1120, a step 1118 is performed in which the grinding surface 905 of the rotating lapping plate 900 is coated with a diamond slurry that functions as an adhesive to grind away material from the exposed face 530 of the bar 513. During the rough grind phase 1120, the lapping plate 900 is rotated about a center spindle 910 by a spindle motor or other means (not shown) as indicated by arrow 912 and simultaneously the lapping tool 810 is moved in a counter-rotational motion. As much as several tens of microns of material may be removed from the exposed face 530 during the rough grinding phase.

After the rough grind phase 1120 is complete, excess slurry is removed (e.g. by washing with water) from the grinding surface of the rotating lapping plate at a step 1125, and then a conductive liquid, such as ethylene glycol, is applied to the lapping plate surface to provide lubrication and minimize buildup of static charge. However, even after washing, sufficient diamond particles remain embedded in the grinding plate 910 to polish the exposed surface 530 and clean up any deep texture marks remaining from the rough grind phase. During the subsequent fine lap phase, rotation of the lapping plate 900 and counter-rotation of the lapping tool may continue. It may be noted that during both the rough grind and fine lap phases, the lapping plate 900 may be rotated as shown by arrow 912, with the result that grinding particles move across the exposed face of the heads transversely to the longitudinal axis of the head elements.

For the subsequent linear lap phase 1140, linear relative motion between the head and the lapping surface parallel to the longitudinal axis of the head elements at the air bearing surface is provided. Rotation of the lapping plate 900 is stopped and the lapping tool 810 is moved linearly to the grinding surface 905, back and forth across the surface of the now stationary lapping plate 900 in an oscillatory motion as indicated by arrow 920. Use of the conductive liquid such as ethylene glycol is continued. The back and forth motion of the row bar on the surface of the lapping plate 900 is parallel to the longitudinal axis of the inductive poles 25, 27 and the MR head elements 15, 17, 19 and 21 (see FIGS. 1 and 2) exposed at the ABS 11. Advantageously, during the linear lap phases, any smearing of the MR head elements or the inductive head pole transversely across the head air bearing surface previously caused by the rotary motion of the lapping plate 900 is also removed. Furthermore, since the direction of the back and forth motion is parallel to the longitudinal axis of the head elements, any smearing which may be caused by the linear lap phase occurs along the longitudinal axis of the head elements and is not likely to extend into the critical insulating layer between the MR and shield elements. Therefore, the likelihood of inter-element shorts at the air bearing surface of the head is minimized and head production yield is increased. Additionally, it is believed that better surface quality and lower element recession at the ABS results from repeated motion over the same relatively small area of the surface of the lapping plate 600 which wears the plate surface smooth in that small region.

Although it may be recognized that the early stages of the entire lapping process (i.e. the rough grind or fast lap and fine lap phases) can be completed utilizing the linear back and forth, oscillatory motion between the lapping surface and the head air bearing surface, the preferred method provides a less time consuming approach. Particularly, the preferred method of rotary or random motion in the early phases removes substantial material in a relatively short time and uses linear motion only in the final phase to provide a smoother surface.

The final phase is a micro-advanced linear lapping phase 1150. The linear lapping continues and furthermore the lapping tool 810 is micro-advanced (i.e. moved very slowly and precisely) in a direction transverse to the linear motion. Preferably, the direction of transverse motion is perpendicular to the direction of linear motion. In other words, in the micro-advanced linear lapped phase 1150, the lapping apparatus, such as described subsequently with reference to FIG. 10, causes the lapping tool 810 to move back and forth across the lapping plate in a linear oscillatory motion, while the micro-advance mechanism slowly moves the entire row transversely.

The micro-advance movement is very slow in comparison to the linear lapping motion. For example, the micro-advance motion (in the y-direction) may be approximately 10 microns per second for thin film magnetic recording heads. In order to provide this motion, a motor can be utilized with sufficient speed control and dampening to provide for continuous motion at extremely low but adjustable velocities. The linear lapping motion is of course less critical in terms of its precise control. Low translation of mechanical noise to the lapping tool, and adjustable stroke rates and lengths is preferable. In one example for thin film recording heads, typical stroke rates are 30 strokes per minute and typical stroke lengths are 200 millimeters. In the following example, a lapping apparatus is described embodying the principles of the invention. It should be understood that the motor that drives the micro-advance mechanism is best automated when controlled by the computer that operates the lapping machine. Therefore, the y-axis advancement characteristic can be automatically set according to process conditions and according to direct feedback from MR devices or other control systems, such as electrical lapping guides.

The preferred implementation of the lapping device requires that the direction of y-axis advancement be such that the serial and/or the eventual lead tapered end of the workpiece is leading the y-axis advancement. That preferred implementation allows the embedded diamond to be worn starting at the tapered end of the workpiece before it reaches the deposition end, thereby providing worn diamond abrasive to the deposition and for optimum smoothness on that end. Of course, by adjusting the y-axis velocity and the x-axis stroke rate in length, the wearing of the embedded diamond particles can be altered. In accordance with the construction of the workpiece (magnetic head) the x- and y-axis motions can be adjusted to produce the optimum wear of the abrasive particles by the time they reach the deposition end. It is believed that the wear state of the diamond particles produces the flat ABS condition in material stacks (such as the thin film magnetic head described herein) when the layers have different hardnesses. By controlling this wear, the slider body, the alumina deposition, and the deposition metals on the head are lapped to a continuous flat surface, while minimizing recession and rolloff.

The process characteristics should be designed to provide optimum performance for the selected diamond particle size, the type of tin lapping plate, the plate finish, the slider material hardness, and the deposition material hardness, and of course, the exact micro-advance movement is set by the product characteristics. In some embodiments, for example if the slider body includes a less hard material, different micro-advance speeds, direction, or even oscillatory y-axis direction might be useful. Preferably, full computer control direct feedback from the head device is employed during the process of lapping, and process variations are monitored and corrected automatically by the computer system. It has been found that by utilizing the micro-advance method, an extremely high surface flatness on material stacks of different hardnesses can be achieved. Using the method described herein, pole tip recession averages have been held below 7.0 nanometers with a sigma of less than 2 nanometers. Although disclosed in the context of thin film magnetic recording heads, the process described herein could be used to make any product having a lapping process and similar requirements and material problems, and is not therefore limited to the exact process, exact material set, or even to production of thin film magnetic recording heads.

Reference is now made to FIG. 10, which is a plan view of a portion of a lapping apparatus implementing the linear lapping process of the present invention. The lapping plate 900 is rotatably mounted on a spindle (not shown) and is rotated as shown by arrow 912 by a conventional spindle motor (not shown). A plurality of lapping tools 810, each including a section 604, are locked in a lapping fixture 1001 that has a plurality of rows situated such that the exposed faces are maintained in contact with the grinding surface 905 of the lapping plate 900. The lapping fixture 1001 is coupled to a mount 1003 that is slidably mounted on a pair of x-axis bars 1005, to allow slidable movement along the x-axis. The x-axis bars 1005 are in turn mounted to a y-slider mount 1007 that is slidably mounted on a pair of parallel y-axis slide bars 1010. The y-axis slide bars 1010 are coupled to a base (not shown).

A micro-advance mechanism illustrated generally at 1020 includes a rail 1022 coupled to the base (not shown), and a pneumatic braking mechanism 1024 including a pair of brake pads 1026 that, when pneumatically activated, press against the rail 1022 to prevent movement except as further described. The micro-advance mechanism 1020 includes a micrometer ball lead screw 1030 driven by a precision DC motor having sufficient speed control and dampening to provide continuous motion at extremely low and adjustable velocities. The micrometer lead screw 1030 is connected through a screw hole in a fixture 1036 that is connected to the pneumatic brake 1024. Thereby, when the brake 1024 is pneumatically actuated, subsequent rotation of the motor 1034 induces a slow but precise movement of the y-axis slider mount 1027 in the y-direction.

The lapping fixture 1001 is also attached to one end of linkage arm 1060. The other end of linkage arm 1060 is attached to, or may be an integral part of a slot plate 1075. Slot plate 1075 includes a longitudinal slot 1074 formed therein, having its longitudinal axis parallel to the y-axis of the lapping apparatus. Cam follower 1073, attached to one end of a crank arm 1071, is disposed within longitudinal slot 1074. The other end of crank arm 1071 is attached to the output shaft of a crank motor 1085. The crank motor turns the crankshaft 1071 such that a center point 1072 of cam follower 1073 traces a circular path 1086 when the crank motor is rotating the crank arm 1071. A cam fork 1077 is slidably mounted on slot plate 1075 and spring loaded or otherwise biased to engage cam follower 1073. Solenoid 1083, which is coupled to cam fork 1077 by linkage 1082, disengages cam form 1077 from cam follower 1073 when energized.

The lapping phases described herein are performed under the control of a control device, such as a conventional IBM AT desktop computer including a microprocessor, an input device (such as a keyboard), a data storage device (such as a magnetic disk drive device), and a memory device (such as a static random access memory).

During the first two lapping phases, the solenoid 1083 is de-energized allowing the cam fork 1077 to engage the cam follower 1073, thus locking cam follower 1073 in a set position within longitudinal slot 1074. Thus, when the crank arm 1071 is rotated, the lapping fixture 1001 also rotates in a circular motion but in the opposite direction relative to the lapping plate 900. Also during the first two phases of the lapping process, the lapping plate 900 is rotating, providing circular relative motion between the lapping tool 810 and the lapping plate 900.

Thus, both the lapping fixture 1001 and the lapping plate 900 are simultaneously rotating during the rough grind and fine lap phases of the lapping process. For the linear lap phases, rotation of the lapping plate 900 is terminated, and the crank arm 1071 is briefly stopped over the lapping plate 900. The brake 1024 is activated using a pneumatic solenoid thus providing pressure against the rail 1022 that is rigidly affixed to the base (not shown) in a manner similar to a brake pad. The activated brake 1024 thus maintains the y-axis mount 1007 in a position where it can be moved only by the micro-advance mechanism. With the motor 1085 still stopped, the solenoid 1083 is energized thus retracting and disengaging cam fork 1077 from cam follower 1073. When the cam fork 1077 is fully disengaged from the cam follower 1073, the cam follower is allowed to move back and forth (i.e. oscillate) along the full length of the slot 1074 formed in the slot plate 1075. Subsequently the crank arm 1071 is rotated with the brake 1024 activated to prevent large-scale movement in the Y direction and the lapping plate 900 not rotating, with the result that the lapping tool 810 is moved back and forth across the lapping plate in a linear oscillatory motion along the x-axis to provide the linear lap phase as described above with respect to FIG. 9.

In one embodiment of the present invention, a lapping plate locking device (not shown) is preferably used to hold the lapping plate 900 rigidly in position during both the linear lap phase 1140 (FIG. 11) and the micro-advanced linear lap phase 1150. In one embodiment of the present invention, the locking device is an activated pressure pad that makes contact with the lapping plate 900 to hold the lapping plate stationary, similar to the activated pressure pads 1026 described above. In an alternative embodiment, the locking device is a shaft (not shown) that extends into a recess (not shown) in the lapping plate 900.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

We claim:

1. A method of lapping a workpiece comprising the steps of:
   (a) providing a lapping machine that has a lapping plate including a grinding surface, a linear motion mechanism for moving the workpiece over the grinding surface in a first direction, and a micro-advance mechanism for controllably advancing the workpiece over the grinding surface in a second direction;
   (b) affixing the workpiece to the lapping machine proximate to the lapping plate;
   (c) depositing an abrasive slurry on the grinding surface of the lapping plate;
   (d) performing an initial lapping stage including moving the grinding surface with respect to the workpiece, so that the workpiece is lapped to a first predetermined lapping target specification;
   (e) washing the grinding surface; and
   (f) performing a micro-advanced lapping stage including micro-advancing the workpiece in the second direction and simultaneously linear lapping the workpiece in the first direction to provide a second predetermined lapping target specification.

2. The method of claim 1 further comprising a step subsequent to said washing step e) of applying a conductive lubricant to said grinding surface before performing said micro-advanced lapping stage.

3. The method of claim 1 wherein said step of depositing an abrasive slurry includes depositing a slurry comprising a diamond abrasive material.

4. The method of claim 3 wherein said washing step e) includes removing loose abrasive material and debris, and leaving some abrasive remaining embedded in the plate provide sufficient abrasion for polishing the ABS in the subsequent step f).

5. The method of claim 1 wherein said initial lapping stage includes moving the grinding plate in a rotary motion with respect to the workpiece.

6. The method of claim 1 comprising an additional step following washing the grinding surface of depositing a lubricant material on the grinding surface of the lapping plate and performing a fine lap stage including moving the workpiece in a rotary direction over the grinding surface.

7. The method of claim 6 further comprising a step subsequent to said fine lap stage, of linearly lapping the workpiece in the first direction without micro-advancing said workpiece.

8. A method of lapping an air bearing surface on an exposed edge of a row of unfinished transducer elements, comprising the steps of:
   providing a lapping machine that includes a grinding plate having a grinding surface, an x-positioner, a y-positioner, and a micro-advance mechanism for controllably advancing the y-positioner;
   affixing the row of unfinished transducer elements with its exposed edge adjacent to the grinding plate;
   depositing an abrasive slurry on the grinding surface;
   performing a rough lapping phase of the exposed edge including removing the grinding surface with respect to the exposed edge until the exposed edge is lapped to a first predetermined tolerance;
   washing the grinding surface to remove loose diamond and debris;
   depositing a lubricating agent on the grinding surface; and
   performing a micro-advanced lapping stage including micro-advancing the y-positioner and continuing linear movement of the x-positioner to provide a final predetermined tolerance.

9. The method of claim 8 wherein said rough lapping phase includes rotating the grinding plate and controlling the x- and y-positioners to rotate the unfinished transducer elements in the opposite direction.

10. The method of claim 8 further comprising a step following the rough lapping phase of performing a second lapping phase subsequent to depositing the lubricating agent on the grinding surface, said second lapping phase including rotating the grinding plate until the exposed edge is lapped to a second predetermined tolerance.

11. The method of claim 8 further comprising a step following said second lapping phase of performing a linear lapping phase including halting the rotation of the grinding plate and moving only the x-positioner in a linear direction to provide linear lapping of the exposed edge to a third predetermined tolerance.

12. The method of claim 8 further comprising the step of cutting said processed wafer into a first section having said plurality of rows.

13. The method of claim 12 wherein said section is affixed to a bond extender piece, and said section is affixed to said lapping fixture via said bond extender piece.

14. The method of claim 8 wherein said processed wafer is cut so that at least one section includes a single row.

15. A method of fabricating a magnetic head including lapping an air bearing surface with a lapping machine that has a grinding wheel with a grinding surface, an x-positioner, and a y-positioner including a micro-advance mechanism, comprising the steps of:
   deposition processing a wafer to form a plurality of unfinished transducer elements aligned in a plurality of rows;
   cutting said wafer into a plurality of sections each including at least one row of unfinished transducer elements having an exposed edge to be lapped to form an air bearing surface for said row;
   affixing at least one of said sections to the lapping machine in a position with the exposed edge adjacent to the grinding surface;
   depositing an abrasive slurry on the grinding surface of the grinding wheel;
   performing an initial lapping stage of the exposed edge including rotating the grinding wheel and controlling the x- and y-positioners to rotate in the opposite rotational direction, so that the exposed edge is lapped to a first predetermined tolerance;
   washing the grinding surface to remove loose diamond and debris;
   performing a linear lapping stage including moving only the x-positioner to provide linear lapping of the exposed edge to a second predetermined tolerance; and
   performing a micro-advanced lapping stage including micro-advancing the y-positioner and simultaneously linear-lapping with the x-positioner in the x direction to provide a third predetermined tolerance.

16. The method of claim 15 wherein said processed wafer is cut into a first section having a plurality of rows.

17. The method of claim 16 wherein said section is affixed to a bond extender piece, and said section is affixed to said lapping fixture via said bond extender piece.

18. The method of claim 15 wherein said processed wafer is cut so that at least one section includes a single row.

19. The method of claim 15 wherein said section is first affixed to a lapping fixture and then said lapping fixture is affixed to said lapping machine.

20. The method of claim 15 wherein said step of depositing an abrasive slurry comprises depositing a slurry comprising a diamond abrasive.

21. A lapping machine for lapping a workpiece comprising:
- a lapping fixture for holding the workpiece;
- a lapping plate having a grinding surface;
- a rotary motion mechanism coupled for rotary movement of said lapping plate;
- a first rail extending in a first direction parallel to the grinding surface;
- a mount coupled for slidable motion over the first rail including means for affixing the lapping fixture and means for positioning the workpiece adjacent to the grinding surface;
- a linear movement mechanism coupled to the first rail for moving the mount over the first rail in an oscillatory linear motion along the first rail;
- a slidable second rail coupled to the first rail, said second rail extending in a second direction parallel to the grinding surface and perpendicular to the first rail; and
- a micro-advance mechanism removably engaged to the second rail for precisely controlling slidable motion of the second rail.

22. The apparatus of claim 21 further comprising a brake coupled between the micro-advance mechanism and the second rail for engaging and disengaging said micro-advance mechanism and said second rail.

23. The apparatus of claim 21 wherein said micro-advance mechanism includes a stepper motor, a precision screw coupled thereto, and a threaded mount removably engaged to the second rail and the precision screw, so that when said micro-advance mechanism is engaged with said second rail, rotation of said precision screw by said stepper motor causes linear motion of said second rail.

24. The apparatus of claim 21 further comprising means for depositing an abrasive slurry on the grinding surface of the lapping plate.

25. The apparatus of claim 21 further comprising means for randomly moving the grinding surface with respect to the workpiece.

* * * * *

UNITED STATES PATENT AND TRADEMARK OFFICE
CERTIFICATE OF CORRECTION

PATENT NO. : 5,749,769
DATED : May 12, 1998
INVENTOR(S) : Church et al

It is certified that error appears in the above-indentified patent and that said Letters Patent is hereby corrected as shown below:

Column 3, line 66; Column 7, lines 38, 40, 49, 58, 65; and
   Column 8, line 18, change "Fig. 5" to --Figs 5, 5A, and 5B--.

Signed and Sealed this

Eighth Day of September, 1998

Attest:

BRUCE LEHMAN

Attesting Officer                Commissioner of Patents and Trademarks